United States Patent [19]

Gunesin

[11] Patent Number: 4,692,492

[45] Date of Patent: Sep. 8, 1987

[54] NON-STAINING, NON-STICKING STYRENIC POLYMERS

[75] Inventor: Binnur Z. Gunesin, Warren, N.J.

[73] Assignee: Mobil Oil Corporation, New York, N.Y.

[21] Appl. No.: 789,886

[22] Filed: Oct. 21, 1985

Related U.S. Application Data

[62] Division of Ser. No. 614,081, May 25, 1984, abandoned.

[51] Int. Cl.⁴ .............................................. C08K 5/54
[52] U.S. Cl. .................................. 524/731; 525/106; 525/263; 525/315
[58] Field of Search ............... 525/106, 101, 263, 315; 524/730, 731

[56] References Cited

U.S. PATENT DOCUMENTS 3,700,630 10/1972 Hamada et al. ..................... 525/191
3,737,479 6/1973 Haaf .................................... 525/106
3,929,931 10/1975 Izawa et al. ......................... 525/905

Primary Examiner—Jacob Ziegler
Attorney, Agent, or Firm—Alexander J. McKillop; Michael G. Gilman; Charles J. Speciale

[57] ABSTRACT

The present invention provides a non-staining, non-sticking styrenic polymer containing a siloxane. The invention further provides a method for forming the styrene/siloxane copolymer blend.

9 Claims, No Drawings

NON-STAINING, NON-STICKING STYRENIC POLYMERS

This is a divisional of copending application Ser. No. 614,081, filed on May 25, 1984, now abandoned.

BACKGROUND OF THE INVENTION

1. Field of the Invention

The present invention relates to styrenic polymers, and specifically to non-staining, non-sticking styrenic polymers.

2. Description of Prior Art

It is well known in the art to produce various shaped articles from polystyrene monomers. These articles, however, suffer from an assortment of defects, such as low resistance to fat-containing foods, i.e., low environmental stress-crack resistance to fatty acids, oils and grease, which act as a cracking agent.

It is now known that polymers containing para-methylstyrene (PMS), and especially high impact poly(p-methylstyrene) (HIPPMS) overcome the above-mentioned defects and are advantageous in other areas as well. See, for example, "A Better Styrene Goes Commercial", Chemical Week, Feb. 17, 1982, pages 42–46.

Even though there are characteristic advantages of one styrenic polymer over another, there are some disadvantages which are common to all styrene polymers. For example, many styrenic polymers are susceptible to staining by staining agents, such as oil, grease or fatty acids. Additionally, while many of the characteristics of HIPPMS are superior to other styrenes, HIPPMS is particularly susceptible to staining, presumably due to the high affinity of the methyl groups in HIPPMS towards fatty acids, etc.

The staining agents initiate the staining process when they are applied to the polymer surface, which is followed by diffusion of plasticization through the bulk of the copolymer. Thus, the surface of the styrenic polymer plays a significant role in whether or not the polymer will be stained.

It is an object of the present invention to modify the surface of styrenic polymers.

It is another object to improve environmental stress-crack resistance properties of styrene copolymers.

It is further an object to minimize the surface wettability of the above-mentioned cracking agents on styrenic polymer surfaces by the modification of these polymers.

It has been found that styrenic copolymers can be synthesized in situ with siloxanes, preferably having a molecular weight in excess of 20,000, in order to form a non-removable, non-staining, non-sticking surface on the base styrenic copolymer.

SUMMARY OF THE INVENTION

The present invention provides a non-staining, non-sticking styrenic copolymer comprising, in combination, a base styrenic copolymer and siloxane. Preferably, the base styrenic copolymer is selected from polystyrene, high impact polystyrene, poly(methylstyrene), poly(p-methylstyrene) and high impact poly(p-methylstyrene), and the siloxane has a molecular weight of at least 20,000. The invention further provides a method for forming a non-sticking, non-staining styrenic copolymer containing a base styrenic copolymer and siloxane, which steps include melt blending the base styrenic copolymer with siloxane in the presence of heat.

Further still, the invention provides a method for forming a non-staining, non-sticking styrenic copolymer, which steps include dissolving rubber into a mixture further comprising p-methylstyrene and siloxane in the presence of a solvent, grafting the p-methylstyrene to the rubber in the presence of siloxane and heat to form a copolymer blend, polymerizing the copolymer blend in the presence of heat, separating the copolymer blend into a solid and liquid fraction, and removing the liquid fraction from the solid fraction.

DESCRIPTION OF SPECIFIC EMBODIMENTS

Non-sticking, non-staining styrenic polymers may be prepared from a variety of styrenic copolymers. For example, it is within the scope of this invention to employ polystyrene (PS), and particularly high impact polystyrene (HIPS), as the basic styrenic copolymer for use in this invention. A summary of the preparation and properties of styrene is given in "Styrene: Its Polymers, Copolymers and Derivatives", Ed. R. H. Boundy, R. F. Boyer, A. C. S. Monograph Series, 1952, Hafner Publishing Co., pages 1232–1245.

Random copolymers may be made with a wide range of comonomers including other vinyl monomers, such as styrene, alpha-methylstyrene, acrylates, including methylacrylate, ethylacrylate, methacrylates, including methyl methacrylate, acrylonitrile, olefins, especially diolefins such as butadiene, isoprene, chloroprene and mono olefins, such as ethylene and propylene.

A more favored class of copolymers contain as an essential monomer component in preparing the base styrenic copolymer p-methylstyrene. It is within the contemplation of this invention to use mixtures of methylstyrene isomers rich in p-methylstyrene. Such mixtures contain at least 90 weight percent, preferably 95 weight percent, more preferably 97 or greater weight percent p-methylstyrene and less than 0.1 weight percent o-methylstyrene, with the balance being m-methylstyrene. A typical mixture contains, by weight, about 97 percent p-methylstyrene, about 3 percent m-methylstyrene, and about 0.05 percent o-methylstyrene. The mixtures are obtained by catalytic dehydrogenation of the mixtures of ethylemthyl benzene isomers described in U.S. Pat. No. 4,086,287, which is incorporated herein by reference. Homopolymers and copolymers prepared from p-methylstyrene are prepared in the known manner utilizing methods analogous to those long used for the preparation of polystyrene and styrene copolymers. The preparation of p-methylstyrene polymers and random copolymers of styrene and p-methylstyrene is described in U.S. Pat. No. 4,306,049, which is incorporated herein by reference.

Another favored class of copolymers are high impact copolymers of poly(p-methylstyrene). The high impact copolymers of poly(p-methylstyrene), e.g., HIPPMS, are generally graft copolymers produced by grafting units derived from the polymerizable mixture onto a generally rubbery backbone polymer. Suitable backbone polymers include polybutadiene, poly(dimethylbutadiene), polyisoprene, polychloroprene and other synthetic rubbers, such as styrene-butadiene rubber, ethylene-propylene rubbers, ethylene-propylene-diene elastomers, polyacrylates, nitrile rubbers and copolymers with other aromatic monomers, including vinyltoluene. The backbone generally comprises 2–25% by weight of the high impact copolymer, preferably 3–10% by weight. Normal techniques, e.g., grafting, comparable to those used for making high impact poly-styrenes are useful; they are well known in the art and referred to, for example, in U.S. Pat. No. 2,694,692 and British Pat. No. 1,054,301.

The high impact copolymers of the present invention were prepared by the proper use of p-methylstyrene in combination with a comonomer, i.e., styrene or methyl methacrylate, in the presence of a diene or saturated type rubber. Preferred examples of the rubber are polybutadiene hsving a 7% 1,2; 35-55% cis; and 35-50% trans microstructure, polyisoprene, high cis-(1,4) polybutadiene having a 98% cis, 2% 1,2 microstructure, ethylene propylene diene terpolymer (EPDM), and butyl rubber. It is within the contemplation of this invention to incorporate other rubbers into the formation of the high impact copolymer of the present invention.

The surface characteristics of the styrenic base copolymers are improved by the addition of siloxanes to the copolymer. Siloxanes are silica-based polymers having repeating units of the formula:

$$[R_2SiO]_n$$

in which R is an alkyl group, usually methyl, and n is a number from 10 to 200. Siloxanes are known to have very low surface free energy values of about 21-22 dyne/cm. Low molecular weight siloxanes, e.g., molecular weight (number average) less than 10,000, are used as silicon oils in order to enhance surface lubrication, e.g., an external lubricant. Higher molecular weight siloxanes, e.g., molecular weight greater than 20,000, have a viscosity which varies from about 20,000 to about 3 million centistokes. It is preferred to use high molecular weight siloxanes in the present invention because they are not readily removed from the surface of the styrenic base copolymers. Additionally, high molecular weight siloxanes maintain a high glass transition temperature (Tg) of the matrix to give extra rubber functionality to the styrenic base copolymer.

A preferred siloxane for the present invention is poly(dimethylsiloxane) (PDMS), although other siloxanes may be used. Due to the large difference in surface free energy values between styrenic copolymers and siloxanes, PDMS is incompatible with PPMS, PS, and copolymers of PMS and styrene. Because of this, PDMS readily diffuses to the surface, thus imparting a permanent non-sticking, non-staining surface.

It is within the scope of this invention to employ two methods for incorporating siloxane into the styrene base copolymer:

(1) melt blending; and
(2) in situ polymerization.

In "melt blending", the styrene base copolymer, e.g., HIPPMS or other PMS, PS or other styrene base polymers, in an amount ranging from about 98% to 99.8% by weight, are melt blended with siloxane, preferably PDMS, at a temperature of approximately 200° C. for about 3 minutes. The final blend is then cooled and pelletized.

In the in situ polymerization method, a mixture of PMS or PS, rubber, siloxane and 10% solvent (V/V) is charged into a dissolver. The combination of PMS and rubber forms the HIPPMS copolymer blend, a preferred ingredient in the final product mixture. Suitable solvents are those which dissolve rubber in the PMS mixture, thus forming a high impact copolymer matrix. Examples of such solvents are paraethyltoluene (PET) and ethylbenzene. The mixture is allowed to dissolve in the dissolver for 1 to 4 hours until a clear solution is formed. At this point, the mixture is charged into a pregrafter and gently agitated at temperatures of between about 100° and 120° C., preferably 110° C. A peroxide catalyst is generally incorporated into the blend in order to reduce the blend temperature to about 100° C. Examples of peroxide catalysts include benzoyl peroxide, acetyl peroxide, t-butyl, peroxyisobutyrate, p-chlorobenzoyl peroxide, 2,5-dimethyl-2,5 cis(2-ethyl hexanoylperoxy)hexane, and t-butyl peroctoate. The copolymer will start to polymerize and chemically attach, i.e., graft, to the rubber until approximately 20% by weight of the mixture is formed into a suspension of a rubber grafted copolymer.

The mixture is then polymerized at a higher temperature, i.e., 125°-130° C. and preferably 130° C. The temperature increase is necessary due to the increased viscosity of the rubber-grafted polymer solution. The solution is allowed to polymerize until approximately 45-50% of the mixture forms a rubber grafted copolymer mixture.

At this point, the mixture is charged to a static reactor which preferably operates at a still higher temperature. The mixture is allowed to gently agitate at a temperature of approximately 130°-140° C. until 70-75% of the solution is converted to a solid rubber grafted copolymer. The other 25-30% of the solution forms the remaining solvent and any unreacted comonomers.

When a 75-80% solid level is reached, the solvent and any unreacted comonomer from the rubber grafted polymer is removed in a devolatizer, which operates under temperature conditions of 200-220° C., and preferably 210° C., and a pressure of 15-20 mmHg. The unreacted solvents and comonomers may be further processed into additional cycles of the high impact copolymer formation. The high impact copolymer is hydrostatically removed from the devolatizer and allowed to cool at ambient temperature. The cooled high impact copolymer is then pelletized.

The polymerization process may also be performed in the following manner: siloxane is dissolved in the styrene copolymer with rubber and polymerized at a temperature of approximately 110° C. for about 4 hours. The polymerization temperature is then increased to 140° C. for approximately 10 more hours. The final polymer is then devolatized, cooled, pelletized and characterized for rubber and siloxane levels.

The resulting polymer blends contain from about 90% by weight to about 99.9% by weight styrene polymer, and preferably from 98% by weight, and from about 0.1% by weight to about 10% by weight siloxane, and preferably from about 0.2% by weight to 2% by weight.

Without wishing to adhere to any one set theory, it is believed that one reason that siloxanes from a non-stick, non-staining coating on styrene base copolymer blends is due to the differences in surface free energy between siloxanes and the polymer blend. For example, PDMS with a trimethyl siloxy terminal group has a surface free energy of about 21 dyne/cm, while PPMS has a surface free energy of about 28 dyne/cm. As a result, the siloxane will diffuse to the surface of the polymer blend and form a thin, permanent coaing. This will decrease the surface stickiness and will enhance the releasability of the polymer from the mold. Because the surface energy is lowered, the surface will not be stained by grease or any other agent which has equal or larger surface energy.

Scanning electron microscopy on the freeze fractured cut surfaces of a molded polymer blend of the present invention showed that siloxane appears in the bulk of the polymer in spherical morphology with particle size of about 5–6 microns.

It is also within the scope of this invention to incorporate PDMS with OH-terminal groups and hydride terminal groups to high impact polymer blends with a very low concentration of tin octoate catalyst. During the injection molding, the articles will form and the surface will be coated with slightly cross-linked polysiloxane. Therefore, solvent and fatty acid resistance of the polymer blend will be improved and the environmental stress crack resistance characteristics will be enhanced. A thin layer of cross-linked siloxane will enhance the surface resistance to fatty acids and solvents and will also impart a pleasing glossy appearance to the surface of the molded polymer product.

The following examples are given in order that the invention may be more fully understood. Proportions and percentages are given by weight.

EXAMPLES 1–6

Examples 1–6 are designed to determine the critical surface tension on the surfaces of styrene polymers and styrene polymer/siloxane blends.

The polymer blends were prepared in a one-stage in situ polymerization reactor in the following manner: poly(dimethylsiloxane) (molecular weight: 400,000) was dissolved in the styrene polymer with cis-1,4-poly(-butadiene) rubber, ethylbenzene and benzoyl peroxide and reacted at a temperature of 110° C. for approximately 4 hours. The temperature was raised to 140° C. and the polymer blend was allowed to react in this environment for another 10 hours. The resulting polymer blend was devolatized at a temperature of 210° C., cooled and pelletized. Control samples contained no siloxane.

X-ray fluorescence techniques were used to determine the actual level of siloxane in the polymer and the siloxane content was calculated. Because high molecular weight siloxanes are part of the bulk of the polymer, the calculated and experimental levels are in agreement. Tests performed on the surface of a molded styrene article revealed that the surface of the molded article is homogeneously covered by by siloxanes. Measurements of critical surface tension were also performed on the molded articles by the Zisman method. The resulting polymer blend for each Example, as well as their corresponding critical surface tension measurements, may be found on Table 1 as follows:

EXAMPLES 7–9

The following examples were designed to test the Environmental Stress Crack Resistance (ESCR) of the polymer blend. ESCR is a standard laboratory method for measuring the resistance of a strand of polymer to tensile pressure after the area of highest stress concentration (generally the center point) of the strand has been exposed to an oil environment. Representative oils include butter, margarine, cottonseed oil or salad oil.

The ESCR in these examples were tested by providing the point of greatest stress on the polymer strands with mixtures of hydrogenated fatty acids. For these examples, Chiffon brand margarine (trademark) was used. The polymers were then tested at 1,000 pounds per square inch (psi). Example 7 tested the control HIPPMS without a blend copolymer. Example 8 tested a blend of about 99% by weight HIPPMS and 1% by weight PDMS. Example 9 tested a blend of 0.5% by weight PDMS with OH-terminal group and 0.5% by weight PDMS with H-terminal group which was well-blended into HIPPMS. Tin octoate was added as a cross-linking agent into the blend at the last minute. The final chopped blend product was used to prepare a melt strand at 200° C. The melt strands were stored for 3 days at ambient temperature and tested for ESCR. Measurements were made of the fail time, i.e., the time required in minutes for pressure at 1,000 psi to snap each polymer strand.

The measurements of the resultant blends are shown in Table 2:

TABLE 2

| Example | Blend | Fail Time (Minutes) |
|---|---|---|
| 7 | HIPPMS (Control) | 8–13 |
| 8 | HIPPMS (99 wt. %)/ PDMS (1 wt. %) | 22–23 |
| 9 | HIPPMS (99 wt. %)/ PDMS-OH Term. Group (.5 wt. %) PDMS-H Term. Group (.5 wt. %) | 55 |

EXAMPLE 10

Example 10 was designed to illustrate the ability of the styrene/siloxane blend to protect against surface penetration of staining agents. Two 100 ml. compression molded sheets were initially prepared by in situ polymerization. The sheets had the following properties:

| Sheet | Composition |
|---|---|
| 1 | 100% HIPPMS (Control) |
| 2 | 98.4% HIPPMS/ |

TABLE 1

| Example | 1 | 2 | 3 | 4 | 5 | 6 |
|---|---|---|---|---|---|---|
| Polymer Blend | | | | | | |
| Polymer Type | HIPPMS | HIPPMS | HIPPMS | HIPS | HIPS | HIPS |
| wt. (g) | 500 | 498 | 499 | 500 | 498 | 499 |
| Ethylbenzene (g) | 60 | 60 | 60 | 60 | 60 | 60 |
| Rubber* (g) | 40 | 36 | 39 | 40 | 36 | 39 |
| Benzoyl Peroxide (ppm) | 200 | 200 | 200 | 200 | 200 | 200 |
| PDMS (g) | 0** | 6 | 2 | 0** | 6 | 2 |
| (wt. %) | 0 | 1.0 | 0.38 | 0 | 1.0 | 0.38 |
| Critical Surface Tension (dyne/cm) | 29 | 22 | 23 | 31 | 24 | 26 |

*TM Polysar
**Controls

| Sheet | Composition |
|---|---|
| | 1.6% PDMS (400,000 M.W.) |

Chiffon brand margarine was spread onto the surface of Sheets 1 and 2 at room temperature and allowed to remain there for 24 hours. Optical microscopy of the molded HIPPMS/PDMS polymer after 24 hours indicated no significant penetration, and the staining agent was easily removed without leaving any stain on the surface of the polymer. Contact angle measurements (Zisman method) indicated no change in critical surface tension of the HIPPMS/PDMS polymer before and after the staining agent application. However, the HIPPMS polymer blend without PDMS was noticeably stained as a result of the staining agent.

Additionally, Instron Rheometer data showed that the presence of 1.6% by weight of PDMS in poly(paramethylstyrene), polystyrene, HIPPMS and HIPS caused a 30% drop in viscosity of melt at 200° C. at low shear rate. Thus, PDMS acts as a "slip-indexing" agent for the polymer blend and facilitates the mold release of the polymer blend.

Although the invention has been described in conjunction with specific embodiments thereof, it is evident that alternatives and variations will be apparent to those skilled in the art in light of the foregoing description. Accordingly, the present invention is limited only by scope of the appended claims.

I claim:

1. A method for preparing a non-staining, non-sticking, high impact polystyrene, which comprises: (a) a solution formed by dissolving a rubber in a mixture consisting essentially of a styrene, a polysiloxane and a solvent; (b) heating the resultant solution to graft polymerize the styrene onto the rubber; and (c) separating the solvent and any unreacted styrene present.

2. A method according to claim 1, wherein graft polymerization is effected by heating the solution at a temperature above 100° C.

3. A method according to claim 1, wherein graft polymerization is effected in the presence of a catalyst.

4. A method according to claim 3, wherein the catalyst is a peroxide.

5. A method according to claim 1, wherein the high impact polystyrene is a copolymer of styrene.

6. A method according to claim 1, wherein the high impact polystyrene is a copolymer of p-methylstyrene.

7. A method according to claim 1, wherein the solvent is ethylbenzene or p-ethyltoluene.

8. A method according to claim 1, wherein the polysiloxane is polydimethylsiloxane.

9. A method according to claim 1, wherein the polysiloxane has a molecular weight in excess of 20,000.

* * * * *